United States Patent [19]

Mallerich, Jr.

[11] 3,736,575

[45] May 29, 1973

[54] SINGLE LINE PER BIT ASYNCHRONOUS CIRCUIT AND SYSTEM

[75] Inventor: Dallas J. Mallerich, Jr., Ellicott City, Md.

[73] Assignee: Dyad Systems, Inc., Randallstown, Md.

[22] Filed: Feb. 1, 1972

[21] Appl. No.: 222,520

[52] U.S. Cl. ................................340/173 R, 328/37

[51] Int. Cl. ..........................................G11c 19/00

[58] Field of Search ...................340/173 R, 174 LC, 340/174 MC; 328/37, 42, 46

[56] References Cited

UNITED STATES PATENTS 3,544,992 12/1970 Kaenel ...............................340/174

*Primary Examiner*—Terrell W. Fears

*Attorney*—Howard L. Rose and Ira C. Edell

[57] ABSTRACT

A single line per bit logic circuit serves as one of plural cascaded stages in a binary register through which data characters are shifted asynchronously, serially by character, parallel by bit. Each stage has a neutral state (no stored information) and an information state (stored information). Control logic in each stage controls shifting as follows: stage *i* receives information from stage ($i-1$) only if stage ($i-1$) is in its information state and stage *i* is in its neutral state; likewise, stage *i* shifts information to stage ($i+1$) only if *i* is in its information state and stage ($i+1$) is in its neutral state. A single line per data bit configuration is made possible by rendering the shift control logic independent of the data bits. In one embodiment, each circuit stores four parallel bits, the shifting of which is controlled by independent logic circuitry in that circuit.

17 Claims, 6 Drawing Figures

Patented May 29, 1973 3,736,575

4 Sheets-Sheet 4

SINGLE LINE PER BIT ASYNCHRONOUS CIRCUIT AND SYSTEM

BACKGROUND OF THE INVENTION

The present invention relates to binary signal storage and shifting circuits and, in particular, is an improvement over a circuit disclosed in U.S. Patent Application Ser. No. 22,991, filed Mar. 26, 1970 by Carlo Faustini, and assigned to the same assignee as is the present invention.

The aforementioned Faustini patent application discloses a unique logic circuit capable of serving as a stage in an asynchronous shift register for binary signals. By asynchronous it is meant that the shifting of a bit from one stage to the next is not under the control of a clock or other such timing arrangement; rather, shifting occurs as each subsequent stage is ready to receive a new bit. The unique feature of the Faustini circuits lies in the fact that each stage is in either an information state, in which it is storing valid information, or a neutral stage, in which it has no valid information. The rules of transfer, as controlled by a logic circuit at each stage, are as follows: if a stage is in its neutral stage it can receive information from the preceding stage as long as the preceding stage is in its information state; if a stage is in its information state it can transfer that information to the next stage if that stage is neutral; no transfer is permitted to a stage in the information stage or from a stage in the neutral state. This philosophical approach permitted Faustini to develop asynchronous registers capable of asynchronously shifting data bits faster than was previously possible.

FIGS. 19 and 22 of the Faustini patent application illustrate shift registers which asynchronously transfer characters comprising plural bits. The characters are transferred serially and asynchronously; the bits in each character are transferred together in parallel. These Faustini circuits utilize two lines to represent each data bit. One reason for this is that Faustini utilizes the condition of the data bits to aid the shift control logic in determining the state (information or neutral) of the stage. A single control line is then used to transmit the state of the stage back to the preceding stage. This arrangement, when utilized to shift $n$ bits in parallel, requires $2n$ input data lines, $2n$ output lines, one input control line and one output control line. In addition a relatively large number of logic components are required for this approach.

It is therefore an object of the present invention to provide an improved circuit of the type described wherein the number of components and the number of input and output connections are significantly reduced.

It is another object of the present invention to provide a circuit of the type described wherein each data bit is represented on a single respective line.

It is a further object of the present invention to provide an asynchronous shift register having the advantages disclosed in the aforementioned Faustini patent application yet which requires significantly fewer components and external connections.

Another problem in prior art shift registers is the lack of capability of asynchronously inhibiting shifting at selected individual stages. Such a capability permits data to be shifted through only part of the register, if desired and affords an extreme degree of operational flexibility.

It is therefore another object of the present invention to provide a shift register in which shifting at any stage may to asynchronously inhibited on command.

It is also an object of the present invention to provide an improved shift register which utilizes fewer components than prior art asynchronous or synchronous shift registers, yet which has greater operational flexibility than such prior art shift registers.

SUMMARY OF THE INVENTION

According to the present invention, control over shifting at each stage is performed independently of the state of the data bits at that stage. As a consequence a single line is employed to represent each data bit and only one additional line is required to control shifting. Thus, where Faustini required $2n+1$ lines plus a relatively large number of components to store and shift n bits, the circuit of the present invention requires only $n+2$ lines and relatively few components to perform the same functions. In one embodiment there is disclosed a inhibit arrangement wherein shifting at any selected stage may be inhibited.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

The description which follows employs a binary logic convention in which a binary 1 is a positive voltage and a binary 0 is substantially ground. Other conventions are possible, of course, and circuit modifications to conform to such conventions are within the scope of this invention.

Figure 1:
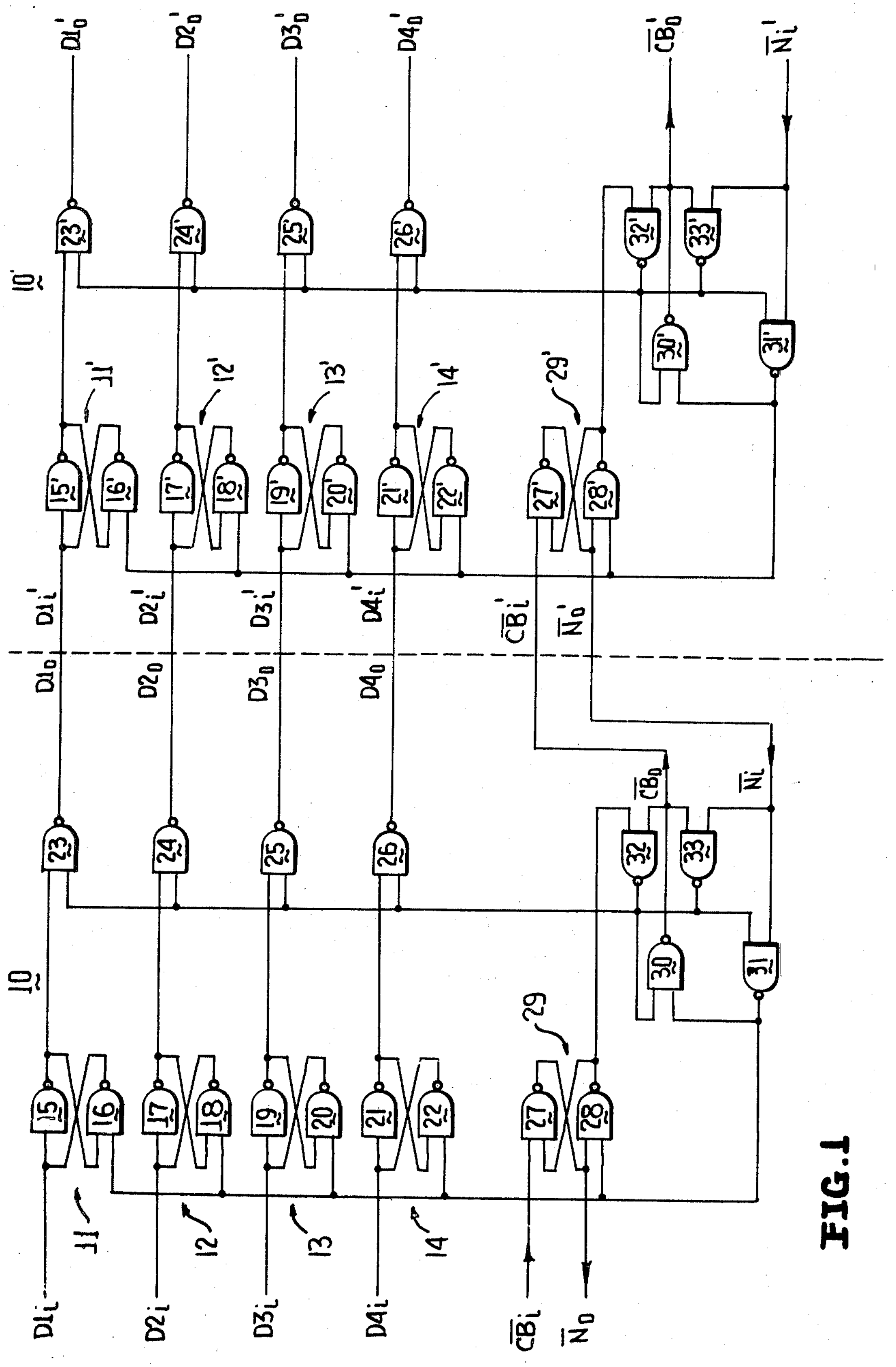
FIG. 1 is a logic gate diagram of two cascaded asynchronous circuits of the present invention.

Referring specifically to FIG. 1 of the accompanying drawings, to identical circuits 10 and 10' are illustrated. These circuits, for example, comprise successive stages in a binary shift register. Like components in each circuit are designated by like reference numerals, differing only by a prime added for circuit 10'. For this reason only circuit 10 is described in detail. Circuit 10 is capable of storing four bits of data as received on four data input lines $D1_i$, $D2_i$, $D3_i$ and $D4_i$, respectively. The circuit is also capable of shifting its four stored data bits to stage 10' on respective data output lines $D1_o$, $D2_o$, $D3_o$ and $D4_o$. Other input signals, the generation of which is described below, are signal $\overline{CB}_i$ (Control Bit input) from the preceding stage (not shown) and signal $\overline{N}_i$ (neutral input) from stage 10'. Other output signals from circuit 10 include $\overline{CB}_o$ (control bit output) to stage 10' and $\overline{N}_o$ (neutral output) to the stage preceding stage 10.

Four data flip-flops 11, 12, 13 and 14 of the set-reset type each comprise a pair of NAND gates interconnected in a well-known manner to achieve bi-stable operation. Flip-flop 11 includes NAND gates 15 and 16; flip-flop 12 includes NAND gates 17 and 18; flip-flop 13 includes NAND gates 19 and 20; and flip-flop 14 includes NAND gates 21 and 22. Signals $D1_i$, $D2_i$, $D3_i$ and $D4_i$ constitute set input signals applied to NAND gates 15, 17, 19 and 21, respectively; these same gates provide the set output signals from their respective flip-flops. These set signals are in turn applied to respective NAND gates 23, 24, 25, and 26 which serve as transmission gates for the data stored in circuit 10.

A control bit flip-flop 29 also comprises two bistably interconnected NAND gates 27 and 28 and receives signal $\overline{CB}_i$ as a set signal at gate 27. Gate 27 supplies output signal $\overline{N}_o$ for circuit 10. The output signal from gate 28, which is the reset output signal for flip-flop 29, is applied to NAND gate 32. The output signal from gate 32 is applied to two more NAND gates 30 and 31, as well as serving as a priming signal for each of transmission NAND gates 23, 24, 25 and 26. NAND gate 31, which also receives the $\overline{N}_i$ input signal, supplies another input signal to NAND gate 30 and also supplies a reset signal to each of the flip-flops at gates 16, 18, 20, 22 and 28. The $\overline{N}_i$ input signal is applied to still another NAND gate 33 which also receives an input signal from NAND gate 30; gate 33 also supplies an input signal to gate 31. The $\overline{CB}_o$ signal from the circuit is derived from NAND gate 30.

The philosophy behind the control of data inflow and outflow at circuit 10 is as follows: stage 10 can only shift its data into stage 10' if stage 10 is in its information state (i.e., — it is storing data) and stage 10' is in its neutral stage (i.e., — it is not storing valid data). If both stages are neutral, or if both have information, or if stage 10' has information when stage 10 is neutral, no transfer can occur between these stages. The state of the stage is always indicated by signal $\overline{N}_o$, to wit: when $\overline{N}_o$ is binary 0 stage 10 is neutral; when $\overline{N}_o$ is binary 1 stage 10 has information. This shaft control philosophy if effected by flip-flop 29 and NAND gates 30, 31, 32 and 33 in the manner described in the following paragraphs.

As a starting point for describing the operation of circuit 10, assume that circuit 10 is in its neutral state, circuit 10' is in its information state (signal $\overline{N}_i$ is binary 1) and the stage preceding stage 10 is neutral (so $\overline{CB}_i$ must be binary 1 since it is not transferring data to stage 10). It is also assumed that flip-flops 11, 12, 13, 14 and 29 are reset, and that $\overline{CB}_o$ is binary 1. Under these circumstances, the output signals from the various NAND gates assume the states indicated in Table I.

TABLE I

| NAND Gate | Output Signal State |
|---|---|
| 15 | 0 |
| 16 | 1 |
| 17 | 0 |
| 18 | 1 |
| 19 | 0 |
| 20 | 1 |
| 21 | 0 |
| 22 | 1 |
| 23 | 1 |
| 24 | 1 |
| 25 | 1 |
| 26 | 1 |
| 27 | 0 |
| 28 | 1 |
| 30 | 1 |
| 31 | 1 |
| 32 | 0 |
| 33 | 0 |

Of interest is the fact that NAND gates 32 and 33, both being in the binary 0 state, maintain transmission gates 23–26 at binary 1. Thus $D1_o$ through $D4_o$ are binary 1 at this time. Actually, the output signals of NAND gates 32 and 33 are joined together in a wired-OR connection so that if either of these gates is binary 0, their common output junction is binary 0 and gates 23–26 are held at their 1 states. A similar wired-OR connection is provided for gates 23 and 16', gates 24 and 18', gates 25 and 20', and gates 26 and 22'. Thus, if either gate in these pairs is binary 0, the common wired-OR junction is binary 0.

It must be stated at this point that the stored data is inverted by the transmission gates 23–26 during transfer of data. This is of no serious consequence, however, because an effective inversion occurs at the input terminal at the data flip-flops. For example, a binary 0 on line $D1_i$ is reflected as a binary 1 at the output line of NAND gate 15. Thus, if gate 23 were suddenly opened for transmission (by switching gates 32 and 33 to binary 1) gate 23 would become binary 1, assuming a binary 1 state at NAND gate 15. $D1_o$, therefore, would be binary 0 which is the logic complement of the binary 1 output signal from gate 15.

Under the conditions described by Table I circuit 10 is incapable of transferring stored signals to stage 10'. This is logical, since stage 10 has no valid information when in its assumed neutral state. To illustrate the lack of transfer capability, assume for the moment that signal $\overline{N}_i$ becomes binary 0, indicating that stage 10' is neutral and ready to receive data. Gate 33 switches to its binary 1 state; but the wired-OR connection between gates 32 and 33 causes the binary 0 state of gate 32 to dominate the common junction, forcing transmission gates 23–26 to remain in their binary 1 states. The binary 0 state of signal $\overline{N}_i$ acts with gate 32 to re-enforce the binary 1 state of gate 31.

Assume once again that the conditions are as indicated in Table I. Circuit 10 is waiting to receive data from its preceding stage. Transfer of data into stage 10 occurs when the transmission gates in the preceding stage are opened. As described, $D1_i$ through $D4_i$ assume binary states which are the logical complements of the states of their respective flip-flops in the preceding stage. Thus flip-flops 11–14 in circuit 10 change state or not in accordance with the states of $D1_i$–$D4_i$. This data transfer is indicated at the control circuitry of stage 10 by signal $\overline{CB}_i$ momentarily becoming binary 0. This switches NAND gate 27 to its binary 1 state, setting flip-flop 29 and causing signal $\overline{N}_o$ to become binary 1. Signal $\overline{N}_o$ is therefore indicating to the preceding stage that stage 10 is in its information state. The setting of flip-flop 29 puts gate 28 in its binary 0 state and applies a binary 0 input signal to gate 32, tending to switch gate 32 to its binary 1 state. Since signal $N_i$ is still binary 1, however, gate 33 remains binary 0, keeping gates 23–26 blocked. This points up the fact that stage 10 cannot transfer its data to stage 10' when stage 10' has valid stored data, as indicated by signal $\overline{N}_i$ being at binary 1. Thus the only gates which changed state upon the described data transfer into stage 10 are gates 27, 28 and 32 as well as those in the data flip-flops which were set by the newly received data. The restoration of signal $\overline{CB}_i$ to binary 1 after momentarily becoming binary 0 has no effect on the state of flip-flop 29 because gate 28, in its binary 0 state, holds the flip-flop set.

With circuit 10 sitting in its information state as described in the preceding paragraph, assume that stage 10' switches to its neutral state, whereupon signal $\overline{N}_i$ goes to binary 0. Since NAND gate 32 receives a binary 0 signal from gate 28, and NAND gate 33 receives the binary 0 $\overline{N}_i$ signal, both gates 32 and 33 become binary 1 and transmission gates 23–26 are "opened" to pass data. Thus, if data flip-flop 11 is set (i.e., - gate 15 is binary 1) $D1_o$ becomes binary 0. If, on the other hand, flip-flop 11 is reset at this time, the binary 0 state of gate 15 maintains gate 23 and $D1_o$ at binary 1. The flip-flops 11'–14' in stage 10' thus assume the binary states of their counterpart flip-flops 11–14 in stage 10.

The changing of signal $\overline{N}_i$ to binary 0 thus permits stage 10 to transfer its data, if it has any, to stage 10'. At the control circuit of stage 10, the change of state at gate 33 to binary 1 does not change the state of gate 31. This is because signal $N_i$ is binary 0 and holds NAND gate 31 in its binary 1 state. However, since the output junction of gates 32 and 33 is binary 1, and since gate 31 is binary 1, NAND gate 30 (and signal $\overline{CB}_o$) goes to binary 0. When signal $CB_o$ becomes binary 0 flip-flop 29' in circuit 10' is set so that signals $N_o'$ and $N_i$ become binary 1. When signal $N_i$ becomes binary 1 gate 31 switches to binary 0 momentarily. This is because both input signals to NAND gate 31, the output signal from gates 32 and 33 and signal $N_i$, are binary 1. Gate 33 remains binary 1 since gate 30 is still binary 0. A short time later gate 30 becomes binary 1 because gate 31 is binary 0. With both input signals to gate 33 now at binary 1, that gate becomes binary 0 and forces gate 31 back to binary 1. The binary 0 pulse from gate 31 resets flip-flops 11–14 and 29; it also changes gate 30 and signal $CB_o$ to binary 1. When gate 33 becomes binary 0 and switches gate 31 back to binary 1, it also holds gate 30 and signal $CB_o$ at binary 1. The resetting of flip-flop 29 has the effect of placing signal $N_o$ in its binary 0 state, indicating that stage 10 is once again in its neutral state. The states of all gates are once again the same as indicated in Table 1.

The operational sequences described above assumed that stage 10' was in its information state at the time stage 10 was switched into its information state. It is also possible for stage 10' to be neutral at the time stage 10 receives information. Under such circumstances the data is passed directly through stage 10 to stage 10'. Specifically, if stage 10 is neutral $\overline{N}_i$ is binary 0 and tends to drive gate 33 to binary 1. But flip-flop 29 has not been set by $\overline{CB}_i$ since it was last reset, and gate 32 is still held at binary 0 by gates 28 and 30. Thus gate 32 dominates gate 33 and maintains gate 30, 31, and 23–26 in their binary 1 states. If now the preceding stage transfers data to stage 10, flip-flops 11–14 assume states according to the received data. In addition flip-flop 29 is set by the binary 0 signal appearing on the $\overline{CB}_i$ signal line. Gate 28 thus switches to binary 0, causing gate 32 to switch to binary 1. The common output junction becomes binary 1, opening the transmission gates 23–26 and causing $\overline{CB}_o$ to become binary 0. The circuit operation at this point is identical to that described above during transfer of data to stage 10'.

It will be appreciated that if a multiplicity of shift register stages are cascaded in the manner of stage 10 and 10', and if all stages are neutral, input data applied to the first stage will be propagated along the entire length of the register. Of course a simulated $CB_i$ binary 0 signal must be applied to the first stage because there is no preceding stage to provide such a signal. Shifting of the signal requires no synchronous clocking but depends only upon the states of adjacent stages.

Importantly, only one data line is required to represent each data bit and only two control signals ($\overline{CB}_i$ and $\overline{N}_i$) are required. While only four data bits are illustrated it is of course possible to expand this number, depending upon the fan-out capability of the control logic gates. If the fan-out capacity is reached, duplicate control circuit gates may be utilized.

Figure 2:
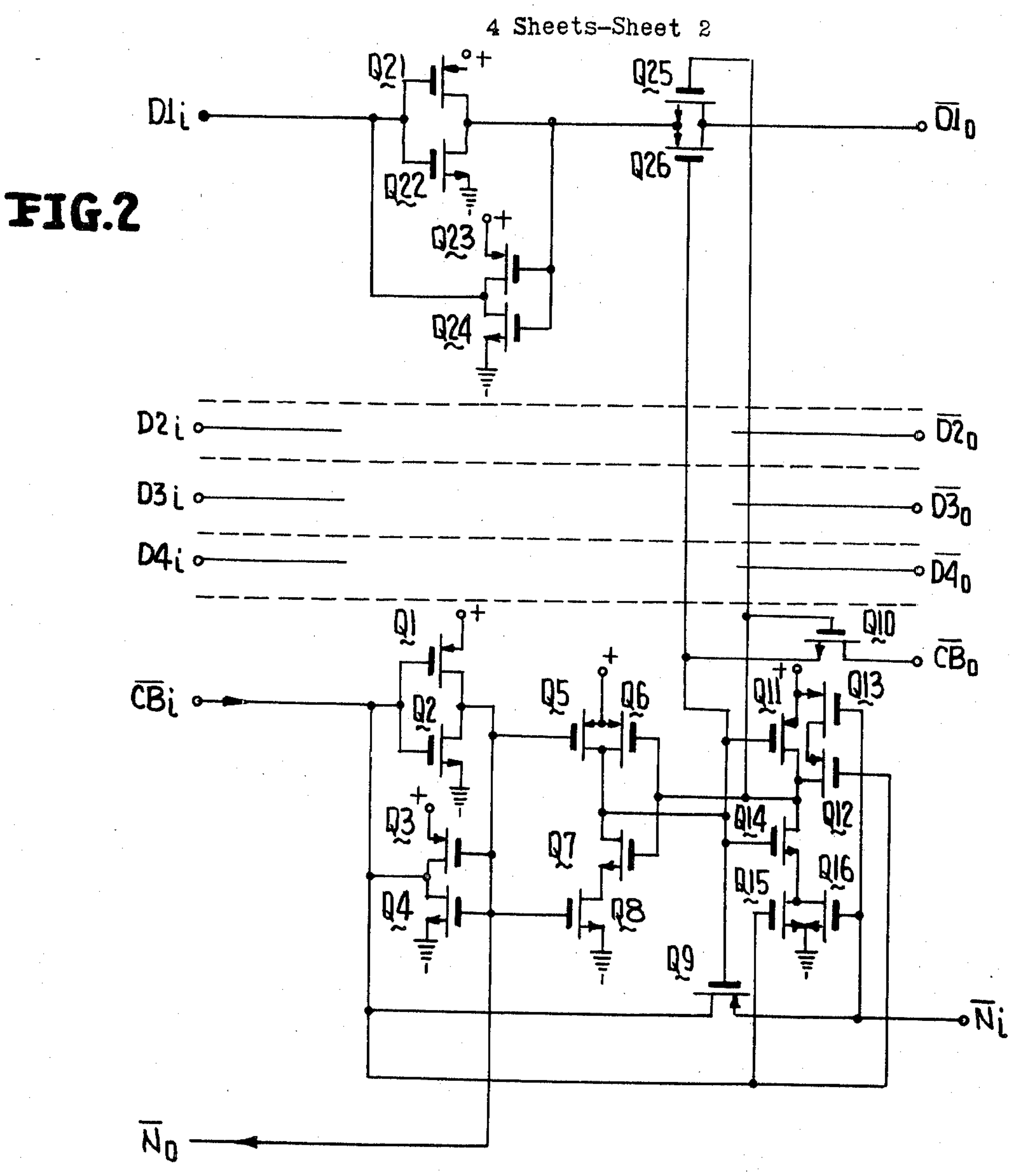
FIG. 2 is a detailed schematic diagram of one of the circuits of FIG. 1.

Referring now to FIG. 2 of the accompanying drawings, another embodiment of the present invention is illustrated. Specifically, the circuit of FIG. 2 is constructed of metaloxide-semiconductor (MOS) field effect transistors (FET's) of the insulated gate type. The circuit of FIG. 2 performs the same basic functions as does circuit 10 of FIG. 1; however only one of the four identical data lines is illustrated in FIG. 2 in order to avoid repetition and conserve space. In addition, as will be described in detail, the data is inverted in each stage, so that a binary 1 stored in stage *i* becomes a binary 0 when stored in stage (*i*+1). The same input and output signals utilized for each stage in FIG. 1 are utilize for the stage illustrated in FIG. 2.

The data circuit for one bit comprises P-type FET's Q21 and Q23, and N-type FET's Q22 and Q24. The source electrodes Q21 and Q23 are connected to a positive voltage supply; the sources of Q22 and Q24 are grounded. The gate electrodes of Q21 and Q22 are tied together and connected to the drain electrodes of Q23 and Q24 as well as to input date line $D1_i$. The drains of Q21 and Q22 are tied together and connected to the gates of Q23 and 24. The connections described for Q21, Q22, Q23 and Q24 define a bistable circuit in which a data bit may be stored. Q23 and Q24 are geometrically designed to provide these transistors with a lower transconductance ($g_m$) parameter than Q21 and Q22 in order that the signal fed back to the gates of Q21 and Q22 can be overridden by the input on line $D1_i$.

It should be pointed out that the data flip-flops in the FIG. 2 embodiment need not be specially reset after data is shifted from the stage. This is contrary to the situation in FIG. 1 where re-setting is required. The reason no reset is needed in FIG. 2 is that the type of flip-flop employed can be both set and reset by the binary signal appearing on the data input line ($D1_i$). The NAND gate flip-flop arrangement of FIG. 1 cannot be conveniently set and reset by the single data line and therefore must be reset after each shifting of data from the stage.

The operation of the bistable circuit is as follows: a binary 0 (− voltage) applied on line $D1_i$ renders Q21 conductive and Q22 cut-off, thereby applying a binary 1 (+ voltage) at the drains of these FET's. This binary 1 cuts off Q23 and renders Q24 conductive so that the drains of these transistors are grounded (binary 0). The binary 0 state is thus fed back and maintained at the gates of Q21 and Q22. The data state inversion (i.e., — binary 0 on line $D1_i$ becomes binary 1 at the drains of Q21, Q22) is apparent from the foregoing. This inversion presents no problem if an even number of shift register stages are used or if an inverter is added to a register having an odd number of stages.

The drains of Q21, Q22 are connected to the sources of a pair of FET's Q25 and Q26 of N- and P-types, respectively. Q25 and Q26 serve as transmission gates for the data bit, their drain electrodes being tied together to provide the $\overline{DI}_o$ signal for the circuit. The gates of Q25 and Q26 are controlled by the control gates included in the circuit and described in detail below.

The control bit flip-flop for the circuit includes four FET's Q1, Q2, Q3 and Q4 which are interconnected in the same way as Q21, Q22, Q23 and Q24, respectively. Input signal $\overline{CB}_i$ is connected to the gates of Q1 and Q2 and to the drains of Q3 and Q4. The output signal from this flip-flop is connected to the gates of N-type FET Q8 and P-type FET Q5. The source of Q5 is connected to positive supply voltage and to the source of N-type FET Q6. The drains of Q5 and Q6 are tied together and connected to the drain of N-type FET Q7. The source of Q7 is tied to the drain of Q8, and the source of Q8 is tied to ground.

The gates of Q6 and Q7 are connected together, to the gate of Q25, to the drains of P-type FET's Q11 and Q12 an N-type FET Q14, and to the gate of N-type FET Q10. The drains of Q5, Q6 and Q7 are tied to the gates of P-type FET's Q9, Q11 and Q26, to the gate of Q14, and to the source of Q10. The drain of Q10 provides the $\overline{CB}_o$ signal for the circuit.

The source of Q11 is tied to the source of P-type FET Q13 and to a positive voltage supply. The drain of Q13 is connected to the source of Q12. The gate of Q12 is connected to the $\overline{CB}_i$ line; the gate of Q13 is connected to the $\overline{N}_i$ line.

The source of Q14 is connected to the drains of N-type FET's Q15 and Q16, the sources of which are grounded. The gate of Q16 receives the $\overline{N}_i$ signal; the gate of Q15 receives the $\overline{CB}_i$ signal.

In describing the operation of the circuit of FIG. 2, initially assume the circuit to be in its neutral state and that $\overline{CB}_i$ is floating and $\overline{N}_i$ is binary 1. Under these conditions, the conducting condition of the source-drain path of each transistor is indicated in Table II.

TABLE II

| Transistor | Condition |
|---|---|
| Q1 | OFF |
| Q2 | On |
| Q3 | ON |
| Q4 | OFF |
| Q5 | ON |
| Q6 | ON |
| Q7 | OFF |
| Q8 | OFF |
| Q9 | OFF |
| Q10 | OFF |
| Q11 | OFF |
| Q12 | OFF |
| Q13 | OFF |
| Q14 | ON |
| Q15 | ON |
| Q16 | ON |
| Q17 | ON |
| Q25 | OFF |
| Q26 | OFF |

The fact that $\overline{CB}_i$ at binary 1 causes Q2 to conduct is what turns Q5 on and Q8 off. This provides a binary 1 at the drain of Q5 to directly control the states of Q9, Q11, Q14 and Q26. With Q14 on, and Q16 turned on by $\overline{N}_i$ at binary 1, the drain of Q14 is grounded (at binary 0) to directly control the states of Q6, Q8, Q10 and Q25. With both Q25 and Q26 cut-off, no data can be transferred out of the circuit to the next stage. With Q10 cut off, the state of the $\overline{CB}_o$ line depends upon the states of Q3 and Q4 in the next register stage. Also to be noted is the fact that with Q2 conducting, the $\overline{N}_o$ signal is binary 0, indicating to the preceding stage that this stage is neutral.

The circuit of FIG. 2, under the conditions indicated in Table II, is waiting to receive data from the preceding stage. Assume now that the preceding stage has data to shift into the stage of FIG. 2. This data is transmitted through the transmission gates of the preceding stage and is inverted upon being stored in the bistable circuit comprising Q21–Q24. The shifting of data into the circuit is accompanied by $\overline{CB}_i$ becoming binary 0. This cuts off Q2 and causes Q1 to conduct, applying a binary 1 to the gates of Q3, Q4, Q5 and Q8 and on the $\overline{N}_o$ line to indicate to the preceding stage that the circuit of FIG. 2 is no longer neutral. When $\overline{N}_o$ becomes binary 1 it has the effect of cutting off Q10 of the preceding stage (as will be seen from a subsequent description of FIG. 2) to once again render $\overline{CB}_i$ floating. However the gates of Q1 and Q2 are held at binary 0 by Q4 which was switched into conduction when Q1 was turned on.

The binary 0 at the drain of Q4 also turns Q12 on and Q15 off. However $\overline{N}_i$ at binary 1 keeps Q16 on and Q13 off to keep a binary 0 at the drain of Q14. This has the direct effect of keeping Q25 off. Also, by keeping Q6 on and Q8 off, it keeps Q26 off. Thus, no data can be transmitted through Q25, Q26 at this time. The new data is thus stored and the circuit awaits a neutral state in the next stage.

If the next stage now becomes neutral, $\overline{N}_i$ becomes binary 0. This immediately renders Q16 cut off and Q13 conductive. Since Q12 is also conductive because of the state of the control bit flip-flop (Q1–Q4), the drain of Q14 becomes binary 1. This causes Q25 to open, permitting conduction to the next stage if the state of the first data bit is binary 1. The binary 1 at the drain of Q14 also turns Q7 on and Q6 off. With both Q7 and Q8 on, the gate of Q26 is at binary 0 and therefore Q26 is on. Thus, if the state of the stored data bit is binary 0, conduction to the next stage is permitted through Q26 at this time.

The binary 1 at the drain of Q14 and the binary 0 at the drain of Q7 combine to turn Q10 on and provide a binary 0 on the $\overline{CB}_o$ line. This sets the control bit flip-flop in the next stage and returns the $\overline{N}_i$ line to binary 1. This binary 1 is transmitted through Q9 which was turned on by the binary 0 at the drain of Q7. The binary 1 passed by Q9 resets the control bit flip-flop (Q1–Q4). At this point the circuit is restored to neutral state with the gates in the conditions represented in Table II. Once again, the delay through the Q1–Q2, Q5–Q8, Q9 loop permitted Q9 to conduct momentarily and when $\overline{N}_i$ returned to binary 1 reset the control bit flip-flop.

If $\overline{N}_i$ becomes binary 0 when the circuit of FIG. 2 is neutral, Q16 is cut-off and Q13 is rendered conductive, as above. However, the binary 1 at the drains of Q3, Q4 keeps Q12 off and Q15 on so that the drain of Q14 remains at binary 0. It is only when the control bit has been set (by $\overline{CB}_i$ going to binary 0) and $\overline{N}_i$ is binary 0 that Q25 and Q26 can be opened.

Figure 3:
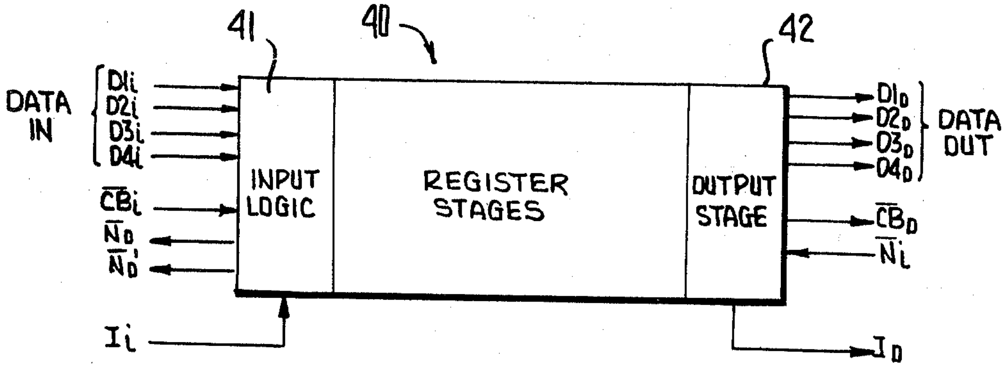
FIG. 3 is a block diagram of a shift register employing the circuits of FIGS. 1 and 2.

FIG. 3 represents in block diagram format a shift register 40 of the type which utilizes multiple cascaded stages of the type depicted in FIG. 2. An input logic section 41 controls the feeding of input data into the register in accordance with both the requirements for data entry and the state (i.e. – neutral or information) of the first register stage. The output stage 42 of the register is provided to permit interface with output equipment.

The input logic section 41 receives four data input lines $D1_i$ through $D4_i$, as well as a simulated $\overline{CB}_i$ signal. An inhibit signal $I_i$ is also applied to the input logic section. Output signals from the input logic section include an $\overline{N}_o$ signal and an $\overline{N}_o'$ signal, the latter differing from the former in a manner to be discussed in relation to FIG. 4.

The output stage 42 has the same input and output signals as the circuit of FIG. 2. In addition an inhibit signal $I_o$ is applied to stage 42.

Figure 4:
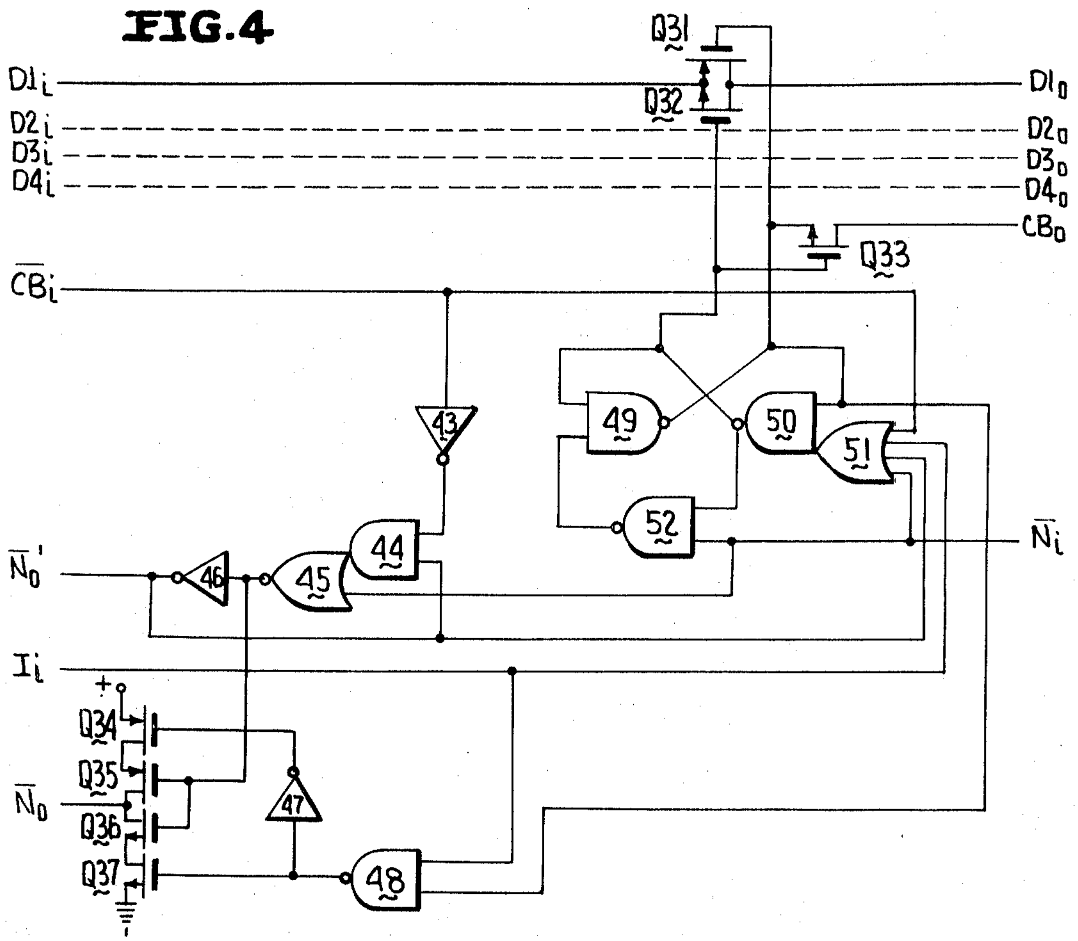
FIG. 4 is a partially detailed schematic-partially logic gate diagram of the input control logic employed in he shift register of FIG. 3.
Figure 5:
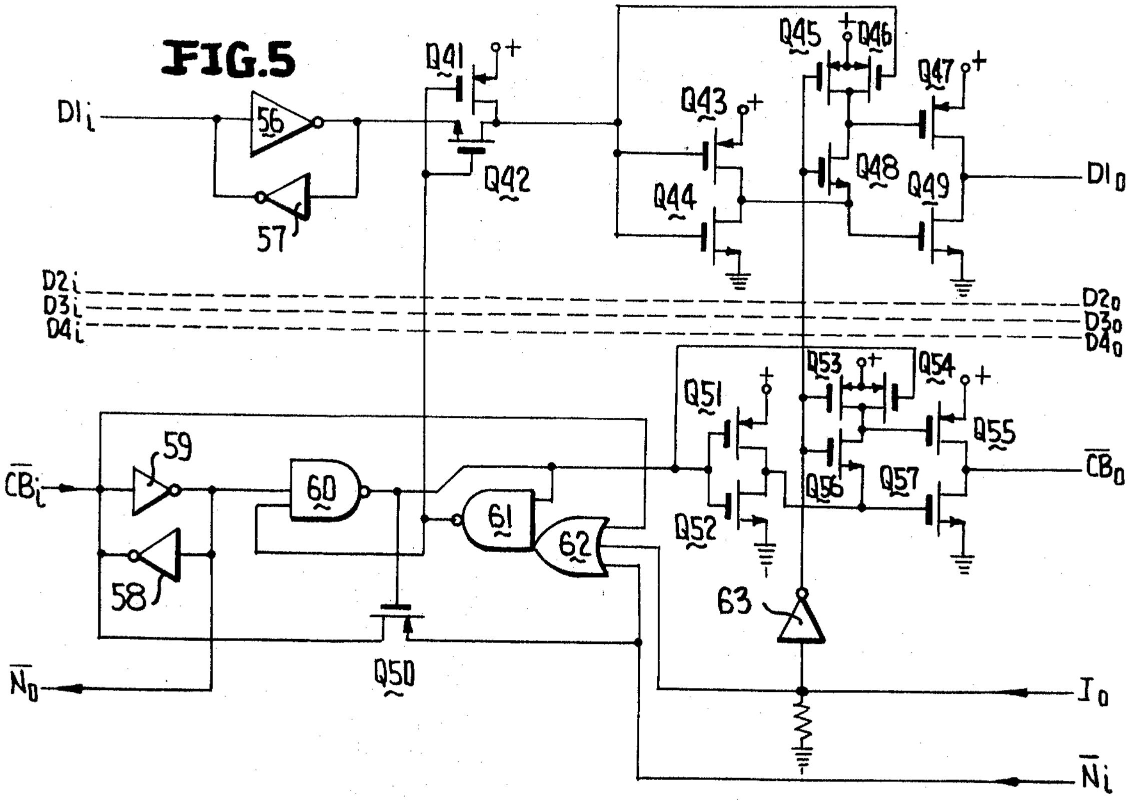
FIG. 5 is a partially detailed schematic-partially logic gate diagram of the output stage of the shift register of FIG. 3.

In a manner which is described in detail in relation to FIGS. 4 and 5 application of data into register 40 requires grounding (to binary 0) the $\overline{CB}_i$ line and grounding whichever data lines are to receive binary 0. A binary 1 on the $I_i$ line inhibits transfer of data into the register. A binary 1 $I_o$ signal inhibits transfer out of the last register stage 42.

Input logic section 41 is illustrated in detail in FIG. 4. Only one data bit path is illustrated in detail in FIG. 4 to avoid repetition. The data bit path simply includes FET's Q31 and Q32 interconnected to operate in the same manner as Q26 and Q25 of FIG. 2. No data bit flip-flops are required in this circuit since the circuit merely serves as a means to permit entry of data into the first register stage in a manner consistent with the operational philosophy of the register.

The simulated $\overline{CB}_i$ signal is applied to a logic inverter 43 which in turn drives one input terminal of a two-input AND gate 44. The second input terminal of AND gate 44 is driven by output signal $\overline{N}_o'$ from another inverter 46. The latter is driven by a two-input NOR gate 45 which receives one input signal from AND gate 44. The second input signal to NOR gate 45 is signal $\overline{N}_i$, which is the same as the $\overline{N}_o$ output signal from the first stage of the register.

The output signal from NOR gate 45 is applied to the gates of P-type FET Q35 and N-type FET Q36, the drains of these FET's being tied together to provide the $\overline{N}_o$ signal from input logic circuit 41. The source of Q35 is connected to the drain of P-type FET Q34, the source of which is connected to a positive supply voltage. The source of Q36 is connected to the drain of N-type FET Q37, the source of which is returned to ground. The gate of Q37 is driven by two-input NAND gate 48 which also drives a logic inverter 47. The latter, in turn, drives the gate of Q34.

One input signal to NAND gate 48 is the inhibit signal $I_i$, which signal is also applied to four-input OR gate 51. Other input signals to OR gate 51 include $\overline{CB}_i$, $\overline{N}_i$ and $\overline{N}_o'$ from inverter 46. OR gate 51 provides one input signal for two-input NAND gate 50 which supplies an input signal to each of two-input NAND gates 49 and 52. NAND gate 52 receives the $\overline{N}_i$ input signal and provides the second input signal for NAND gate 49. The output signal from NAND gate 49 is fed back as an input signal to NAND gate 50.

The output signal of NAND gate 49 is applied to the gate of transmission FET Q31 and to the source of N-type FET Q33. The output signal of NAND gate 50 is applied to the gates of Q32 and Q33. Q33 provides a $\overline{CB}_o$ output signal to control the control bit flip-flop in the first register stage.

When the circuit of FIG. 4 is not shifting data into the register, the flip-flop comprising NAND gates 49 and 50 is reset such that gate 49 is in its binary 1 state and gate 50 is in its binary 0 state. This maintains Q31, Q32 and Q33 cut off so that data cannot be transferred into the first register stage and $\overline{CB}_o$ ($\overline{CB}_i$ in the first register stage, see FIG. 2) is floating. If $I_i$ is binary 1, OR gate 51 maintains gates 49 and 50 in these states, thereby inhibiting entry of data into the register. Only when $I_i$ is binary 0 can the circuit of FIG. 4 enter data into the register.

Assume initially that $\overline{CB}_i$, and $\overline{N}_i$ are binary 1 and that $I_i$ is binary 0. Both $\overline{CB}_i$ and $\overline{N}_i$ individually act through OR gate 51 to maintain NAND gates 49 and 50 in their binary 1 and 0 states, respectively. $\overline{CB}_i$ also inhibits inverter 43 to provide a binary 0 to AND gate 44. AND gate 44 thus applies a binary 0 to NOR gate 45; however the binary 1 $\overline{N}_i$ signal inhibits NOR gate 45 and provides a binary 1 $\overline{N}_o'$ signal from inverter 46. The binary 0 from NOR gate 45 turns Q35 on and Q36 off. The binary 0 $I_i$ signal keeps NAND gate 48 at binary 1 to keep Q37 on; gate 48 also inhibits inverter 47 to keep Q34 on. With Q34 and Q35 on and with Q36 off, signal $\overline{N}_o$ is binary 1. Thus, both $\overline{N}_o$ and $N_o'$ are binary 1 at this time. It is only when $I_i$ is binary 1, thereby cutting off Q34 and Q37, that $\overline{N}_o$ can assume a stage different from that of $\overline{N}_o'$.

Assume now that $\overline{N}_i$ becomes binary 0, indicating that the first register stage is neutral. NAND gates 49 and 50 remain in their binary 1 and 0 states, respectively, because $\overline{CB}_i$ is binary 1 and keeps OR gate 51 at binary 1. However the binary 0 $\overline{N}_i$ signal combines with the binary 0 from AND gate 44 to provide a binary 1 output signal from NOR gate 45. Signal $\overline{N}_o'$ becomes binary 0 and removes another shifting inhibit signal from OR gate 51. The binary 1 from NOR gate 45 also cuts off Q35 and turns on Q36. With Q36 and Q37 both conducting, signal $\overline{N}_o$ also becomes binary 0.

Assume now that it is desired to apply input data to the register. $\overline{CB}_i$ is momentarily grounded at the same time appropriate ones of lines $D1_i$–$D4_i$ are grounded. This grounding, or application of binary 0 signals may be effected manually or under automatic control of a data processor or computing circuit. Each grounded data line represents the entry of a binary 0 bit into the register. When $\overline{CB}_i$ is momentarily grounded, OR gate 51 goes to binary 0, switching NAND gate 50 to binary 1. NAND gate 52 remains at binary 1 because $\overline{N}_i$ is binary 0, and NAND gate 49 goes to binary 0. Q31 and Q32 are turned on, permitting the input data to be shifted into the first stage. Q33 is also turned on, putting $\overline{CB}_o$ at 0. The binary 1 applied to AND gate 44 from inverter 43 has no immediate effect since gate 44 receives a binary 0 $\overline{N}_o'$ signal.

Of course the $\overline{CB}_o$ binary 0 signal, when received at the first register stage, causes $\overline{N}_i$ to return to binary 1. This switches gates 49 and 50 back to binary 1 and 0, respectively, turning off Q31, Q32 and Q33. $\overline{N}_i$ in its binary 1 condition also switches NOR gate 45 to its binary 0 state, and thereby renders both $\overline{N}_o$ and $\overline{N}_o'$ as binary 1 signals.

The circuit of FIG. 4 thus requires binary 0 $\overline{CB}_i$ and $\overline{N}_i$ signals before it can pass data to the first stage. $\overline{CB}_i$, of course, is controlled externally of the register. $\overline{N}_i$, however, reflects the state of the first register stage. As long as the first register stage is storing valid information, no further information can be shifted into that stage.

Referring now to FIG. 5, a modified version of the circuit of FIG. 2 is illustrated, the modification being intended for the last stage 42 of register 40 in FIG. 3. Part of FIG. 5 employs logic gate notation rather than repeating details of the MOSFET logic. Thus, inverter 56 of FIG. 1 represents FET's Q21 and Q22 of FIG. 2. Similar counterparts between FIGS. 2 and 5 are indicated below in Table III.

TABLE III

Counterpart Components

| FIG. 2 | FIG. 5 |
|---|---|
| FET Q21, Q22 | Inverter 56 |
| FET Q23, Q24 | Inverter 57 |
| FET Q3, Q4 | Inverter 58 |
| FET Q1, Q2 | Inverter 59 |
| FET Q5–8 | NAND gate 60 |
| FET Q11–Q16 | NAND gate 61, OR gate 62, minus additional input for I. |
| FET Q9 | FET Q50 |

Other components in FIG. 5 represent modifications made to the circuit of FIG. 2.

The flip-flop for data line $D1_i$ comprises reverse-connected inverters 56, 57 and applies its output signal to the source of N-type FET Q42. The drain of Q42 is tied to the drain of P-type FET Q41, to the gates of P-type FET's Q43 and Q46, and to the gate of N-type FET Q44. The source of Q41 is connected to a positive supply voltage. The gates of Q41 and Q42 are driven by the control logic circuit to be described.

The source of Q43 is connected to a source of positive voltage; the source of Q44 is grounded; and the drains of Q43 and Q44 are tied together and to the source of N-type FET Q48 and the gate of N-type FET Q49.

An P-type FET Q45 has its source tied to the source of Q46 and to a positive supply voltage. The drains of Q45 and Q46 are tied together and to the drain of Q48 and the gate of P-type FET Q47. The gates of Q45 and Q48 are driven in common by logic circuitry described below. The source of Q47 is connected to positive supply voltage; the source of Q49 is grounded; and the drains of Q47 and Q49 are tied together to provide the $D1_o$ output line for the circuit.

The control bit flip-flop for the circuit comprises reverse-parallel connected inverters 58, 59 and is driven by the $\overline{CB}_i$ signal received from the next to last register stage. The output signal of the control bit flip-flop is the $\overline{N}_o$ signal from the last stage and is applied to the next to last stage. This signal is also applied to two-input NAND gate 60 which receives its other input signal from another two-input NAND gate 61. NAND gate 61 also drives the gates of Q41, Q42. One input signal for gate 61 is the output signal from gate 60 which also is connected to the gate of P-type FET Q50. The second input signal to gate 61 is received from a three-input OR gate 62 which receives as input signals the following: $\overline{CB}_1$, $\overline{N}_i$ and $I_o$. $\overline{N}_i$ is also applied to the source of Q50 and $\overline{CB}_i$ is also connected to the drain of Q50.

A series of seven FET's Q51-Q57 correspond in type and interconnections to FET's Q43–Q49, respectively, described above. The gates of Q51, Q52 and Q54 are connected to receive the output signal from NAND gate 60. The drains of Q55 and Q57 provide the $\overline{CB}_o$ signal for the circuit. Inhibit signal $I_o$ is applied to an inverter 63 which drives the gates of each of Q45, Q48, Q53 and Q56.

The inhibit effect of the $I_o$ input signal may be described as follows. When $I_o$ is binary 1 (inhibit condition), inverter 63 applies a binary 0 to the gates of Q45, Q48, Q53 and Q56. Q48 and Q56 are thus biased off whereas Q45 and Q53 are on. Q45 thus applies a binary 1 to the gate of Q47 to bias that FET off and prevent line $D1_o$ from going positive. Q53 likewise maintains Q55 off to prevent $CB_o$ from going positive.

A binary 1 $I_o$ signal applied to gate 62 keeps in its normally binary 1 state and NAND gate 61 is in its binary 0 state. Under these conditions, Q42 is biased off and Q41 is conducting. This biases Q43 and Q46 off and turns Q44 on. Q44 effectively grounds the gate of Q49 to cut that FET off and thereby assure that the $D1_o$ line does not go to ground. Likewise, NAND gate 60 at binary 1 cuts off Q51 and Q54 but causes Q52 to conduct. This grounds the gate of Q57 and prevents $\overline{CB}_o$ from going to ground. Thus, when the inhibit signal $I_o$ is binary 1, the data output lines and the $\overline{CB}_o$ line remain floating.

Assume now that $I_o$ goes to binary 0. This has no effect on the states of NAND gates 60, 61 for it is assumed that $\overline{CB}_i$ and $\overline{N}_i$ are still binary 1. However, inverter 63 now applies a binary 1 to the gates of Q45, Q48, Q53 and Q56, turning Q48 and Q56 on and cutting off Q45 and Q53. With Q48 conducting, the gate of Q47 is grounded through Q48 and Q44. Q47 is thus conducting and $D1_o$ is clamped to a binary 1 level. $\overline{CB}_o$ is also at binary 1 because the gate of Q55 is grounded through Q56 and Q52.

Assume now that $\overline{N}_i$ goes to binary 0, either under manual control or under the control of automatic external circuitry awaiting data from the circuit of FIG. 5. OR gate 62 remains binary 1 because $\overline{CB}_i$ is still assumed to be binary 1. Thus $N_i$ at this time has no effect on gates 60, 61 nor on the shifting of data from the circuit. Moreover, since Q50 is maintained cut off by gate 60, $\overline{N}_i$ cannot affect the control bit flip-flop.

If now $\overline{CB}_i$ goes to binary 0, indicating that data is being shifted into the data flip-flop comprising inverters 56, 57, inverter 59 goes to binary 1 and inverter 58 goes to binary 0. Signal $\overline{N}_o$ goes to binary 1 with inverter 59. OR gate 62 switches to its binary 0 state, NAND gate 61 to binary 1 and NAND gate 60 to binary 0. Q41 is cut off but Q42 turns on, permitting the just-received data to pass. The states of Q43, Q44 and Q46 at this time depend upon the state of the data bit being passed. If the data is binary 0, Q43 and Q46 conduct and Q44 cuts off. Q43 drives Q49 into conduction, grounding the $D1_o$ line to pass the binary 0 state. If the data is binary 1, Q43 and Q46 are cut off and Q44 conducts to cut off Q49. However conduction by Q46 drives Q47 into conduction to pass the binary 1 data to the $D1_o$ line.

To signify to the external circuit that data is being shifted out of the register, $\overline{CB}_o$ is driven to binary 0 at the time of shifting. This is effected by NAND gate 60 in its binary 0 state. Specifically, the binary 0 from gate 60 causes Q51 and Q54 to conduct and Q52 to become cut off. Q51 drives Q57 into conduction, grounding the $\overline{CB}_o$ line.

When the external circuit has received the data, $\overline{N}_i$ returns to binary 1. The immediate effect is to reset the control bit flip-flop (58, 59) through Q50 which in turn switches NAND gates 60 and 61 back to their binary 1 and 0 states, respectively. Q42 is biased off, preventing further shifting and the circuit returns to its neutral state.

Figure 6:
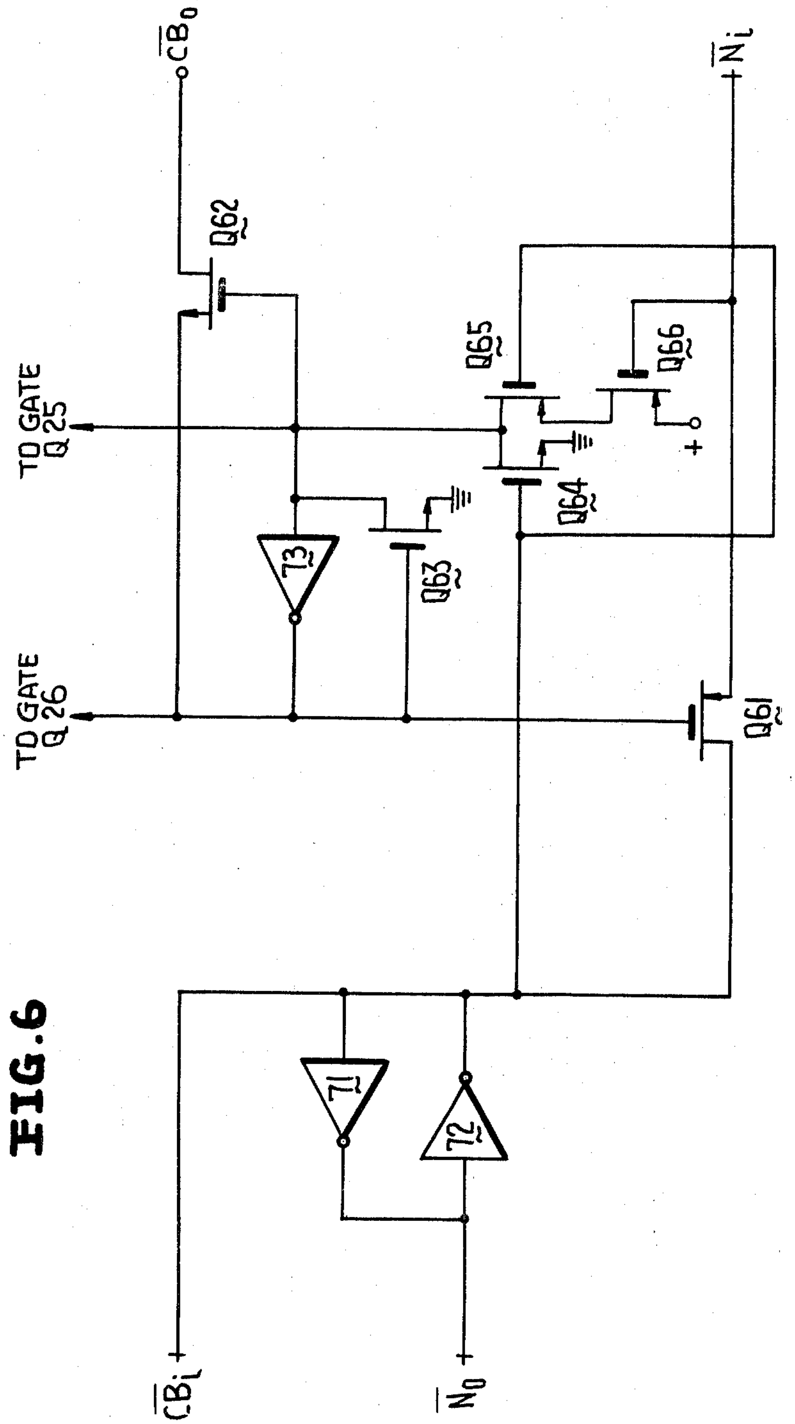
FIG. 6 is a partially detailed schematic-partially logic gate diagram of a modified control circuit for use in the embodiment of FIG. 2.

The control circuit of FIG. 2, comprising FET's Q1 through Q16, operates as described to provide the intended advantages for the shift register stage. Another embodiment of that control circuit, capable of direct substitution into FIG. 2, is illustrated in FIG. 6 and requires only twelve FET's. Specifically, the control bit flip-flop in FIG. 6 includes reverse-parallel connected inverters 71 and 72, corresponding to FET pairs Q1, Q2 and Q3, Q4, respectively in FIG. 2. The output signal from inverter 72 is tied to the $\overline{CB}_i$ signal and drives the gates of N-type FET Q64 and P-type FET Q65. The output signal from inverter 71 is the $\overline{N}_o$ signal for the stage.

The source of Q64 is tied to ground and its drain is tied to the drains of Q65 and N-type FET Q63. The source of Q63 is also grounded. The source of Q65 is connected to the drain of P-type FET Q66, the source of which is tied to a positive supply voltage. The gate of Q66 is driven by the $\overline{N}_i$ signal which also drives the source of P-type FET Q61; the drain of Q61 is connected to the $\overline{CB}_i$ signal.

Another pair of FET's are connected to form an inverter 73, the input line for which is tied to the drain of Q63 and to the gate of N-type FET Q62. The output signal from inverter 73 drives the gates of Q63 and Q61, and is also connected to the source of Q62. The drain of Q62 provides the $\overline{CB}_o$ signal for the stage.

The control circuit of FIG. 6 may replace that of FIG. 2 by simply connecting the output signal of inverter 73 to the gate of Q26 and the input signal for inverter 73 to the gate of Q25.

In operation, assume the circuit to be in its neutral state and that $\overline{CB}_i$ and $\overline{N}_i$ are both binary 1. Under these circumstances, the states of the output signal of inverter 71 is binary 0 and inverter 72 provides a binary 1 signal. Inverter 72 thus renders Q64 conducting and Q65 cut-off. Q66 is also cut-off by virtue of the binary 1 $\overline{N}_i$ signal.

With Q64 conducting, the input signal to inverter 73 is at binary 0 so that the output signal from inverter 73 is binary 1. The transmission gates Q25, Q26 are thus cut-off and no data can be shifted from the stage. Q62 is also cut-off so that $\overline{CB}_o$ cannot be driven to binary 0 to signify a data transfer to the next stage. The binary 1 signal from inverter 73 drives Q63 into conduction to "latch" the input signal to inverter 73 at ground or binary 0 level. Inverter 73 also maintains Q61 cut-off at this time.

Under the described conditions the data circuit associated with FIG. 6 is waiting to receive data from the preceding stage. When data is shifted into the data circuit $\overline{CB}_i$ becomes binary 0, changing the states of inverters 71 and 72 to binary 1 and binary 0 respectively. $\overline{N}_o$ becomes binary 1 to indicate that the stage contains valid data. Q64 is now cut-off and Q65 is conductive. However Q66 is maintained off by the binary 1 $\overline{N}_i$ signal so that the positive voltage at the source of Q66 cannot be applied to inverter 73. Inverter 73, therefore, remains "latched" by Q63 with a binary 0 input signal and binary 1 output signal. Under these conditions the transmission gates Q25, Q26 remain off, along with Q61 and Q62.

If the next stage now becomes neutral, indicating it is available to receive data, $\overline{N}_i$ becomes binary 0 and drives Q66 into conduction. The positive voltage at the source of Q66 is now applied to inverter 73, as well as to the gates of Q25 and Q62. Q63 is designed to have a relatively low transconductance and is therefore unable to maintain inverter 73 latched in the presence of the high positive voltage applied through relatively high transconductance devices Q66 and Q65.

Inverter 73 changes state along with Q25 and Q26 which pass the data stored in the stage. Q62 is driven into conduction and passes a binary 0 signal to indicate a shift condition to the next stage. Q61 is also driven into conduction, permitting $\overline{N}_i$, when it returns to binary 1, to reset the control bit flip-flop (inverters 71, 72). The resetting of the control bit flip-flop drives Q64 back into conduction to thereby switch inverter 73 and turn of Q25, Q26, Q61 and Q2.

The major advantage of the circuit of FIG. 6 resides in the fact that it requires only 12 FET's. Thus, if each data stage requires four FET's per bit for storage and two FET's per bit for transmission or shifting, a four bit (half-byte) arrangement requires a total of only 36 FET's. This is considerably fewer elements than is required for either synchronous or asynchronous shift registers in the prior art.

It should be noted at this point that the inhibit function described and illustrated in relation to FIG. 5 is applicable for all register stages, not merely the output stage. In other words, each stage may be provided with its own $I_o$ line which serves to inhibit shifting at that stage. Data entered into the register can thus be held or delayed at will at any stage.

Another factor to be considered is that the transmission gates associated with each stage may just as readily be located in the data input line as in the data output line. Under such conditions, the data in stage $i$ is automatically transmitted to stage $i+1$; however the input transmission gates at stage i+1 do not permit the data flip-flops to enter the new data until stage $i+1$ has shifted its old data to stage $i+2$ and thereby becomes neutral.

It is also important to point out the fact that storage techniques may be varied within the scope of the present invention. Thus, whereas two types of data flip-flops have been disclosed herein, dynamic storage techniques, for example, utilizing capacitive charge in MOS components may also be employed.

Another advantageous feature of the present invention is the fact that the shift register is fully sequential in response to the $\overline{CB}_i$ signal. In other words, data is transmitted into a neutral stage each time $CB_i$ falls to binary 0, but only one such data transfer can be effected. For each data shift $\overline{CB}_i$ must be returned to binary 1 and then switched to binary 0.

An important advantage of the present invention resides in the fact that the control logic does not require sensing of the states of the data bits. Therefore the data bit circuit may be greatly simplified so that each data bit requires only a single flip-flop and one input and output line.

In its simplest form, the circuit may be looked upon as comprising a flip-flop or storage element for each data bit, the state of which is controllably transmitted through a transmission gate, directly to the corresponding flip-flop in the next stage. The control circuit requires a control bit flip-flop which is set upon shifting of data into the stage and reset upon transmission of data to the next stage. A logic arrangement effects shifting only when the control bit flip-flop is set and the next stage is neutral.

While I have described and illustrated specific embodiments of my invention it will be clear that variations of the details of construction which are specifically illustrated and described may be resorted to without departing from the true spirit and scope of the invention as defined in the appended claims.

I claim:

1. An asynchronous system comprising a pair of cascaded asynchronous circuits each including a data storage section for storing binary data and a control section, said control section having at least two stable states including an information state during which the storage section is storing valid data and a neutral state during which the storage section is devoid of valid data; means including a single line per data bit connecting said circuits to permit transfer of binary data from a first of said pair of circuits to a second of said pair of circuits; said control section including means for transferring binary data from said first of said pair of circuits to said second of said pair of circuits when the control section of said first circuit is in its information state and the control section of said second circuit is in its neutral state; said control section also including means responsive to transfer of binary data to said second circuit from said first circuit to switch said control section of said first circuit to its neutral state and to switch said control section of said second circuit to its information state.

2. The system according to claim 1 wherein said data storage section includes a single data storage element per data bit to be simultaneously stored in said data storage section, each data storage element having a single input line and means for switching that data storage element to a stable state in accordance with a binary signal on said input line; said means for transferring including an output gate section for normally inhibiting transfer of data between said pair of circuits and responsive to the concurrent existence of said second circuit in its neutral state and said first circuit in its information state for passing binary signals to the input lines of flip-flops in said second circuit, said binary signals representing the states of respective data storage elements in said first circuit.

3. A shift register of the type in which multi-bit data characters are shifted asynchronously serially by character and parallel by bit, said register including a plurality of like circuits comprising respective successively arranged register stages, *i*−1, *i*, *i*+1, etc., each of said circuits, and particularly at stage i, including:

a data storage section for storing a plurality of bits of a character, said data storage section including one input line and one output line per bit to be stored in said data storage section;

output gate means selectively actuable to supply binary output signals to respective input lines of the data storage section of stage *i*+1 of said shift register, each of said binary output signals representing the state of a respective bit stored in the data storage section of stage *i* of said shift register;

a control section including actuable logic circuit means having a neutral stable state to be assumed when stage *i* is available to receive a data character from stage *i*−1, an information state to be assumed when stage *i* has received and is storing a data character, and a transient state to be assumed when stage *i* is in the process of transferring its stored data character to stage *i*+1, said circuit means comprising:

means for providing to stage *i*−1 a first binary control signal at a first binary level when said logic circuit means is in said neutral state and at a second binary level when said logic circuit means is in said information state;

means for providing to stage *i*+1 a second binary control signal at one binary level when said logic circuit means is in said transient state and at another binary level when said logic circuit means is not in said transient state;

means for inhibiting said output gate means from passing said binary output signals when said logic circuit means is not in said transient state;

means responsive to said one binary level of the second binary control signal provided by stage *i*−1 for switching said logic circuit to said information state;

means responsive to said first binary level of the first binary control signal provided by stage *i*+1 being provided in combination with said logic circuit means in said information state for actuating said output gate means to supply said binary output signals and for switching said logic circuit means to said transient state;

means responsive to said second binary level of the first binary control signal provided by stage *i*+1 in combination with said logic circuit means in said transient state for switching said logic circuit means out of transient state and into said neutral state.

4. The register according to claim 3 wherein said data storage section includes one flip-flop per bit to be stored in said data section, each flip-flop connected to a respective one of said input lines and including means for switching said flip-flop into a stable binary state representing the binary level appearing on said input line.

5. The register according to claim 4 further comprising means for resetting all of said flip-flops to a reference binary state in response to switching of said logic circuit means to said neutral state.

6. The shift register according to claim 4 wherein said logic circuit means comprises:

a control bit storage element including: means responsive to said one binary level of the second binary control signal provided by stage *i*−1 for switching said control bit storage element to a first stable state; means responsive to a change to said second binary level in said first binary control signal provided by stage *i*+1 for switching said control bit flip-flop to a second stable state; and said means for providing said first binary control signal; and gating means responsive to said control bit flip-flop in its first stable state in combination with the first binary control signal from stage *i*+1 being at said first binary level, for actuating said output gate means and for generating said second binary control signal at said one binary level.

7. The shift register according to claim 6 wherein said flip-flops in said data storage section each include a first pair of field effect transistors of opposite type and a second pair of field effect transistors of opposite type, each transistor including gate, source and drain electrodes, the gate electrodes of each pair of transistors being connected together and to the drain electrodes of the other pair of transistors, the source electrodes in each pair of transistors being connected across a supply voltage, wherein the gate electrodes of said first pair of transistors serve as a single input terminal for said flip-flop and the gate electrodes of said second pair of transistors serve as the single output terminal of said flip-flop.

8. The shift register according to claim 3 wherein said logic circuit means comprises:

a control bit storage element including: means responsive to said one binary level of the second binary control signal provided by stage $i-1$ for switching said control bit storage element to a first stable state; means responsive to a change to said second binary level in said first binary control signal provided by stage $i+1$ for switching said control bit flip-flop to a second stable state; and said means for providing said first binary control signal; and gating means responsive to said control bit storage element in its first stable state in combination with the first binary control signal from stage $i+1$ being at said first binary level, for actuating said output gate means and for generating said second binary control signal at said one binary level.

9. An asynchronous circuit for storing a plurality of data bits in parallel, said circuit comprising:

a data storage section;

a transmission gate section;

a control section;

said control section having multistable means providing first and second stable states;

said data storage section including a plurality of data storage circuits, one for each parallel data bit to be stored;

a number of data leads equal in number to the plurality of data storage circuits in said data storage section;

said transmission gate section being disposed between said storage section and said data leads;

means for switching said control section to an unstable state;

said transmission gate section being responsive to signals developed by said control section when in said first stable state to inhibit signals on said data leads representative of the state of said storage section and being responsive to signals developed by said control section when in said second stable state to develop on said data leads signals indicative of the state of said storage section; and means responsive to said unstable state of said control section for causing said control section to assume a further stable state.

10. The circuit according to claim 9 further comprising means for at-will inhibiting said transmission gate section.

11. The circuit according to claim 9 wherein said data bistable circuit consists of four field effect transistors, said transmission gate consists of two field effect transistors, and said control bistable circuit and logic gate means consists of 12 field effect transistors.

12. A binary data storage and transfer circuit controlled by first and second externally supplied binary control signals, said circuit comprising:

at least one data bistable circuit for storing a data bit, said data bistable circuit including a single input line for receiving data, means for switching said data bistable circuit to a stable state representing a binary signal applied to said input line, and a single output line for providing a binary signal representing the current stable state of said data bistable circuit;

at least one transmission gate connected to said output line and including means responsive to a binary gating level applied thereto for passing a binary output signal representing the current state of said data bistable circuit;

a control bistable circuit including means responsive to said first control signal at a first binary level for switching said control bistable circuit to a first stable state, and means responsive to a reset signal applied to said control bistable circuit for switching said control bistable circuit to a second stable state; and logic gate means operative in response to said control bistable circuit being in said first stable state in combination with said second control signal being at a predetermined binary level to said transmission gate and for applying said reset signal to said control bistable circuit.

13. The circuit according to claim 12 wherein said circuit stores and transfers a plurality of data bits in parallel and further includes a plurality of said data bistable circuits, one for each parallel data bit, and a plurality of said transmission gates, one for each data bistable circuit, and means for applying said binary gating level to all of said transmission gates simultaneously.

14. A shift register comprising a series of cascaded circuits of the type defined by claim 13, each circuit further comprising:

means responsive to the state of said control bistable circuit for providing said second control signal for the next preceding circuit in said series, said second control signal being at said predetermined binary level when said control bistable circuit is in its second stable state; and means responsive to said logic gate means for providing said second binary control signal to the next succeeding circuit in said series, said second binary control signal being at said predetermined binary level only when said binary gating level is applied to said transmission gates.

15. A shift register employing a series of like stages in cascade arrangement for storing and asynchronously shifting plural data bits in parallel, each stage comprising:

a data circuit comprising plural set-reset data storage elements, one data storage element for each parallel data bit to be stored and transferred;

a control circuit including: a control bit storage element of the set-reset type and having first and second stable states, and logic gate means; and actuable transmission gate means responsive to said logic gate means for shifting the data bits stored in said data storage elements to respective data storage elements in the next successive stage in said series via one data line per bit;

wherein said logic gate means comprises first means responsive to said control bit storage element being in its first stable state in combination with the control bit storage element of the next succeeding stage in said series being in its second stable state for actuating said transmission gate means to shift the data stored in said data storage elements; second means responsive to said control bit storage element being in its second stable state for inhibiting shifting of data by said transmission gate means; and third means responsive to actuation of said transmission gate means by said first means for switching the control bit storage element of the next successive stage in said series to its first stable state.

16. The shift register according to claim 15 further comprising independently actuable means associated with at least one of said stages for inhibiting the transmission gate means in that stage.

17. The shift register according to claim 15 wherein:
each data storage element consists of four field effect transistors;
each transmission gate means consists of two field effect transistors;
said control bit storage element consists of four field effect transistors; and
said logic gate means consists of eight field effect transistors.

* * * * *

UNITED STATES PATENT OFFICE
CERTIFICATE OF CORRECTION

Patent No. 3,736,575 Dated May 29, 1973

Inventor(s) Dallas J. Mallerich, Jr.

It is certified that error appears in the above-identified patent and that said Letters Patent are hereby corrected as shown below:

Column 18, Claim 12, line 21, after "level" insert --for applying said binary gating level--.

Signed and sealed this 19th day of March 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.